United States Patent [19]

Sclater et al.

[11] Patent Number: 4,674,159

[45] Date of Patent: Jun. 23, 1987

[54] STENTER FRAME CLIP CHAIN ASSEMBLY

[75] Inventors: Alexander Sclater, Barrhead; Wallace Cunningham, Newton Mearns; Graham Green, Saint Leonards, all of United Kingdom

[73] Assignee: Proctor & Schwartz, Limited, Glasgow, Scotland

[21] Appl. No.: 784,217

[22] Filed: Oct. 4, 1985

[30] Foreign Application Priority Data

Oct. 4, 1984 [GB] United Kingdom ............... 8425045

[51] Int. Cl.$^4$ .............................................. D06C 3/04
[52] U.S. Cl. ............................................ 26/93; 26/89
[58] Field of Search .......................... 26/89, 93, 94, 73

[56] References Cited

U.S. PATENT DOCUMENTS

| 1,478,454 | 12/1923 | Renold | 26/96 |
| 3,240,412 | 3/1966 | Zygan et al. | 26/93 X |
| 3,247,544 | 4/1966 | Bromley | 26/73 |
| 3,391,421 | 7/1968 | D'Onofrio et al. | 26/73 |
| 3,500,515 | 3/1970 | Cunningham et al. | |
| 3,580,451 | 5/1971 | Fraitzl | 29/93 X |
| 3,688,557 | 9/1972 | Marinus | 26/93 X |

FOREIGN PATENT DOCUMENTS

| 2058575 | 5/1972 | Fed. Rep. of Germany. | |
| 2558765 | 3/1977 | Fed. Rep. of Germany. | |
| 2841510 | 9/1979 | Fed. Rep. of Germany. | |
| 2825210 | 12/1979 | Fed. Rep. of Germany | 26/73 |
| 59-135127 | 8/1984 | Japan | 26/93 |
| 326054 | 3/1930 | United Kingdom | 26/89 |
| 1504450 | 3/1978 | United Kingdom. | |
| 2034361 | 6/1980 | United Kingdom. | |

Primary Examiner—Robert R. Mackey
Attorney, Agent, or Firm—Richard H. Thomas

[57] ABSTRACT

Stenter apparatus for stretching film comprises stenter frame clip chain assemblies adapted to grip opposite edges of the film. Each chain assembly includes a plurality of chain clip units (5) which are movable on a double track rail system (3, 4). Each clip unit (5) carries a series of rollers wherein rollers (10a, 10b) with a horizontal axis run on an edge of a track (4) for chain weight support while a plurality of vertical axis rollers (7a, 7b, 8, 9, 12) engage side surfaces of the track assembly to resist horizontal loading. A further roller (11) serves to prevent uplift of the chain assembly. The clip units (5) are linked by articulating link means comprising spaced link plates (21, 22) pivotally carried by link pins (23) in the clip units, each link pin additionally serving to support a drive roller (15). A film clip (6) is located on each chain clip unit (5) and above the articulating link means. Preferably the tracks (3, 4) are spaced vertically.

11 Claims, 4 Drawing Figures

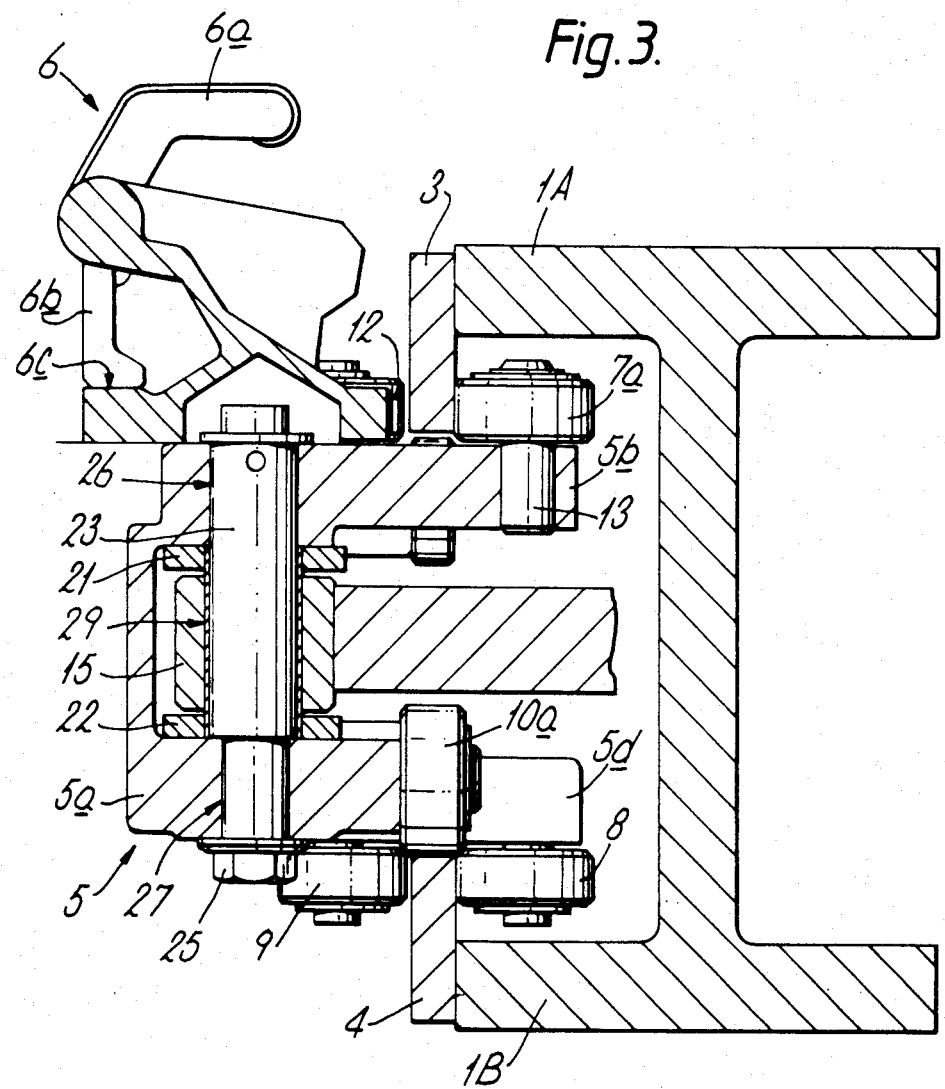

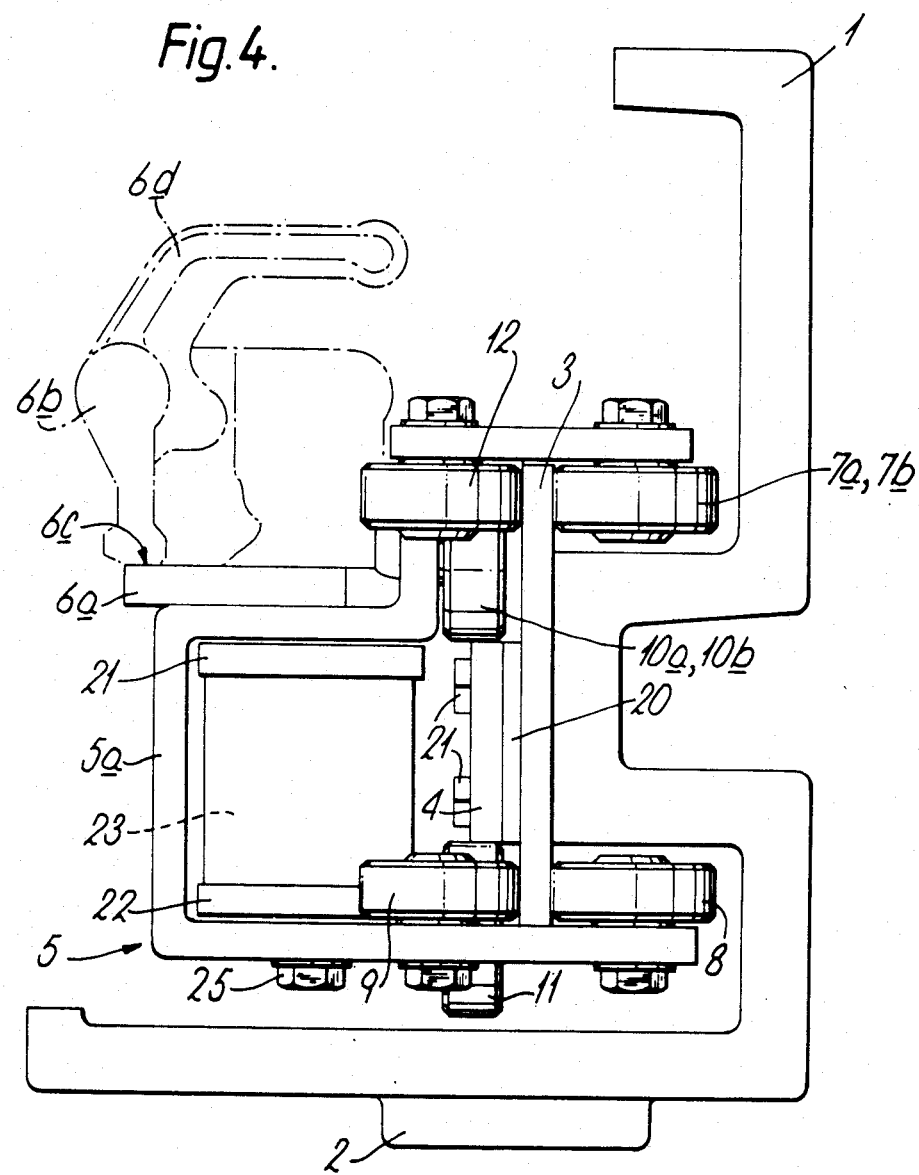

STENTER FRAME CLIP CHAIN ASSEMBLY

This invention relates to an improved form of stenter frame clip chain assembly and, in particular, to those utilizing rollers for the clip chain running on substantially continuous tracks.

In one known design of stenter clip chain assembly described in British Patent specification No. 1,504,450, the assembly includes a laminated track strip carried by a support casting. On the vertical faces of the track strip, vertical axis rollers catering for the horizontal loads run on the face adjacent to the film clip and on the side remote from the film clip. These rollers provide horizontal guidance for the chain, the components of the chain tension arising at convex and concave curves and, in the case of the latter rollers, additionally the film stretching load. The weight of the chain and the clip is taken by a single horizontal axis roller running on the top edge of the track strip and any tendency to upward drift of the chain is resisted by a further roller contacting the bottom edge of the track strip. In this arrangement there are six track lines on which rollers run from which the clip chain is constrained and guided. In this prior construction, the complete clip is mounted on the film side of the chain such that the distance between the gripping line and the vertical center line of the chain is considerable.

An alternative clip assembly design incorporates a vertical track member and a horizontal member disposed on the side of the vertical track member remote from the film clip. The general chain guidance forces and tension force components are contained by vertical axis rollers, one roller located below the chain line and on the film clip side while two rollers are located in line with film stretching load and on the side remote from the film clips. Chain weight is taken by a single horizontal axis roller running on the horizontal back track. The couple produced by clip chain weight tends to keep the vertical axis rollers in contact with the vertical track member. The clip is mounted above the chain such that the distance between the gripping line and the vertical center line of the chain is minimal and a fraction of that described above.

In high speed stenters, the rollers carrying the chain weight have an arduous duty due to the imprecise running surface of the laminated strip of the above described first design and the horizontal track of the second design which requires great accuracy in the manufacturing methods of the clip chain base and the joints of the track.

The first design has the comparative advantage of being constrained against upward movement by the bottom rollers but has the disadvantage of having the weight carrying rollers above the film line, thus the rollers with the most arduous duty and having a greater need for surface lubricant are these rollers above the line of the film clip and film such that exposure to contamination from lubricant and related detritus is thereby increased.

In the second design, the film and film clip does not have the same exposure to contaminant because the weight carrying roller is located well to the rear and at a lower level than the film clip but the design provides a less effective method of controlling any tendency to upward clip drift. An additional contamination hazard in the first design arises from the locating of the top strand of the duplex drive chain above the film clip level.

Further, in the first design, the distance between the gripping line and the vertical centerline of the chain iss more than twice that in the second design. This results in a greater tendency for film splits to arise from longitudinal stretching of the film edge between adjacent clips when the chain articulates in passing around the first significant point of track divergence when, for example, entering the stretching zone.

This tendency to split may be reduced by thickening the edges of the film at the casting process but this causes excessive losses during subsequent trimming when the thickened bead and attendent non-uniformly stretched edge is removed from both sides of the web.

It is an object of the present invention to obtain a preferential disposition of rollers, chain and clips which will substantially reduce the individual disadvantages noted above of contamination from exposed position of rollers, reduced efficiency by undesired longitudinal stretching between adjacent clips in combination with a roller system providing full stability in two planes.

Accordaing to the present invention, a stenter film clip chain assembly comprises chain clip units, a rail to movalby support said chain clip units, film clips supported by the chain clip units, a support structure for said rail, a plurality of rollers carried by each chain clip unit and, engagiñg said rail and chain link means adapted for driving engagement by drive means for driving the chain assmebly wherein the rail comprises a twin track assembly including two separate tracks, and the rollers include vertically spaced vertical axis rollers engaging said track assembly to restrain horizontal forces and horizontally spaced horizontal axis rollers engaging a surface of said track assembly for weight support and a further horizontal axis roller engagable with a surface of the track assembly to restrict upward lift of the chain clip unit, the surfaces engaged by the horizontal axis rollers being located between the levels of the vertically spaced vertical axis rollers, and wherein the chain link means is located substantially underneath the film clip.

Preferably, said chain link means comprises a roller link adapted for engagement with a toothed drive sprocket wheel for driving of the chain assembly.

In the one preferred embodiment, the track assembly comprises a vertically spaced pair of opposed but aligned vertical tracks, the vertical axis rollers running on side surfaces of the tracks and the horizontal axis rollers running on the opposed edge surfaces of the tracks.

In an alternative embodiment, the split track assembly comprises a spaced parallel pair of vertical tracks, a longer one of the tracks providing side surfaces for engagement by the vertical axis rollers while the other shorter track provides edge surfaces for the horizontal axis rollers.

Preferably, the stenter film clip comprises a base body part, and the film clip includes a film gripping platform and a co-operating gripping lever, the film gripping platform being an upper horizontal surface of the base body part.

The present invention is also a stenter film clip chain assembly comprising chain clip units, rail means to movably support said chain clip units, and film clips carried by said chain clip units, said rail means comprising a twin track assembly with two separate tracks arranged in vertical spaced relationship, each chain clip unit rotatably supporting horizontally spaced horizontal axis rollers engaging a surface of one of said tracks for weight support, and first and second vertically spaced vertical axis rollers engaging side surfaces of respective upper and lower tracks to restrain horizontal forces.

Preferably, a further horizontal axis roller is provided engaging one of the tracks of the track assembly to restrict upward lift of the chain clip unit.

Preferably further, said vertically spaced tracks are aligned vertically.

Embodiments of the present invention will now be described by way of example with reference to the accompanying drawings in which:

FIG. 3 shows a similar view as in FIG. 1 but of a modified stenter film clip chain assembly; and FIG. 4 shows a cross-sectional side view of a stenter film clip chain assembly according to another embodiment of the present invention.

Figure 1:
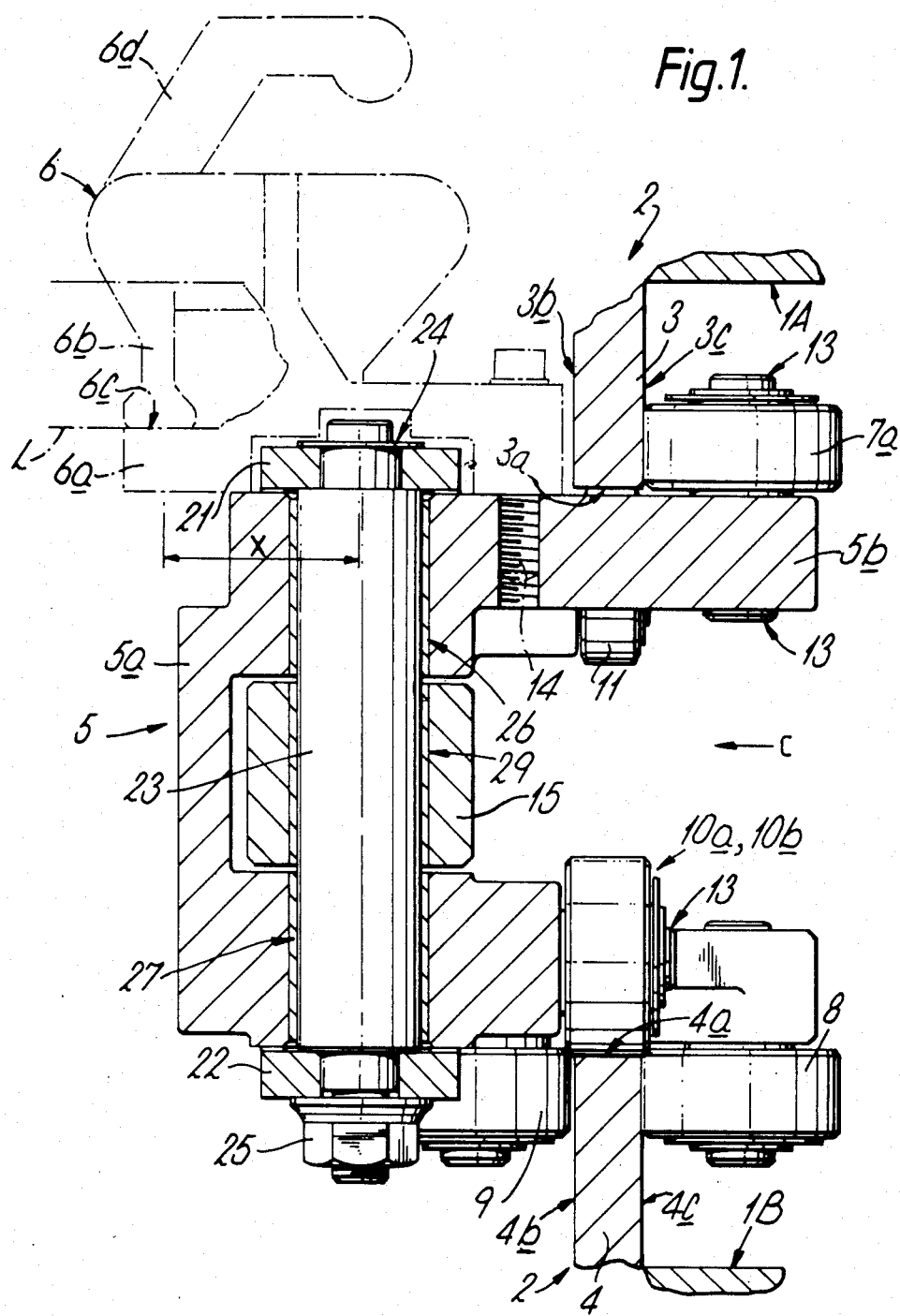
FIG. 1 shows a cross-sectional side elevation of a stenter film clip chain assembly through section A—A in FIG. 2 and according to a first embodiment of the present invention.
Figure 2:
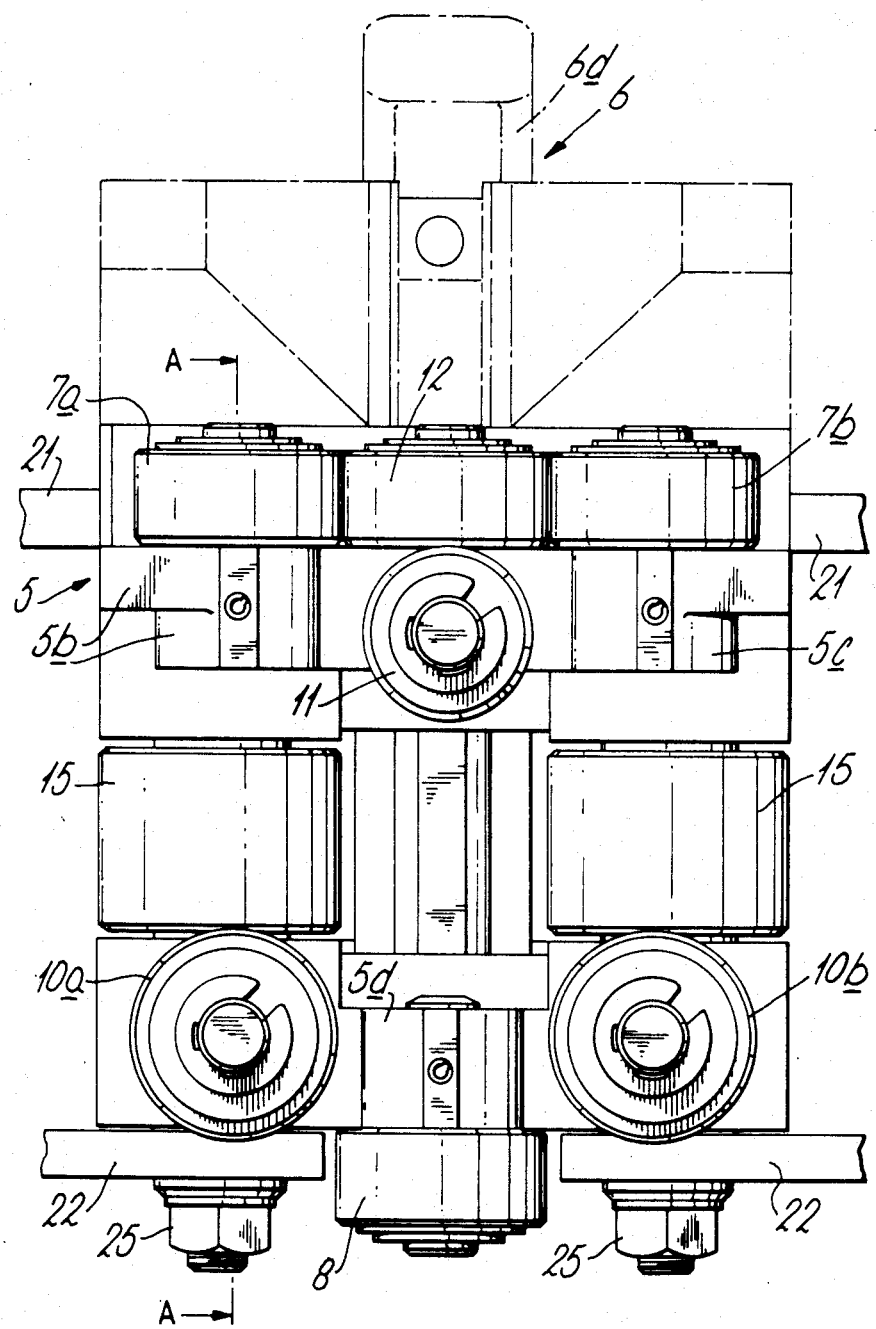
FIG. 2 shows a front view of the clip of FIG. 1 looking in direction of arrow C in FIG. 1.

Referring to FIGS. 1 and 2, stenter apparatus for stretching film comprises opposed stenter clip chain assemblies movably carried by respective rails 2 and which chain assemblies serve to grip opposed longitudinal edges of the film and cause appropriate stretching of the film on chain movement. Each rail 2 comprises a double-track rail assembly having vertically spaced tracks 3, 4 with one track located directly above the other, and each track 3, 4 is supported by a respective flange 1A, 1B of a rail support structure which includes articulations (not shown) to facilitate changes in the path of the chain assemblies. Each clip chain assembly includes chain clip units 5 which are supported and guided by the tracks 3, 4 through rollers (later described) on the units 5, the tracks 3, 4 presenting a continuous surface to the rollers of the units 5 except at the zones of end sprocket wheels (not shown) for the chain assemblies, and a chain tensioning device (not shown) may be provided at said zones. Each track 3, 4 is of rectangular cross-section and for convenience may be of jointed construction.

Each chain clip unit 5 comprises a chain base part 5a in the form of a casting and on the base part 5a are rotatably mounted vertical axis rollers 9, 12 which can engage vertical walls 4b, 3b respectively of tracks 4, 3. Further, the base part 5a includes projecting arms 5b, 5c rotatably carrying vertical axis rollers 7a, 7b which engage an outer side wall 3c of track 3, and an additional lower arm 5d rotatably supporting vertical axis roller 8 engaging outer side wall 4c of track 4.

The base part 5a also rotatably carries horizontal axis rollers 10a, 10b and 11. As can be seen in FIG. 2, the rollers 7a and 7b are laterally spaced on either side of roller 12, while the rollers 10a, 10b are laterally spaced on either side of rollers 8, 9. The various rollers are rotatably supported via shafts 13 pinned into bores in the base part 5a. The film load (stretching) is essentially transmitted to the tracks 3, 4 through the rollers 7a, 7b and these rollers in combination with the rollers 8, 9 also bear the chain tension force components which arise at concave and convex curves in the path of the rail assemblies. It will be noted that the rollers 7a, 7b are closely adjacent the film level L for effective operation.

The horizontal axis rollers 10a, 10b transmit the chain (and clip) weight to the upper surface 4a of track 4 and any tendency for the clip chain to drift upwards is prevented by the horizontal axis roller 11 contacting the lower edge 3a of track 3: since roller 11 will be subject to less loading than the rollers 10a, 10b, the roller 11 can be of smaller diameter than the rollers 10a, 10b. In the front view of FIG. 2, rollers 7a, 7b are vertically aligned with rollers 10a, 10b respectively, with the remaining rollers 8, 9, 11 and 12 located therebetween and in vertical alignment.

The base part 5a supports a film clip 6 which includes a film gripping platform 6a and a co-operating gripper lever 6b which together define the film level L and the film grip line 6c, the film clip 6 being located on an upper horizontal surface of the base part 5a by dowel pins 14. The clip 6 additionally includes a lever arm 6d operable by cam surfaces (not shown) for movement of the gripper level 6b to and from the film gripping position.

The chain clip units 5 are pivotally linked together by means of upper and lower chain link plates 21, 22 which are located by chain pins 23 in the base part 5a, the pins 23 having end necks to receive the links while each pin 23 is removably located by means of an upper circlip 24 and a lower nut 25 on a threaded neck portion of the pin. As can be seen in this embodiment, the link plates 21, 22 are positioned externally of the base part 5a and are consequently widely spaced. Since the link plates 21, 22 are displaced at a substantial vertical dimension, these plates 21, 22 provide increased stability in the chain assembly at the points of rail divergence (for film stretching) and at the chain turnaround at each end of the machine. The pin 23 is journalled in separate journal bearing bushes 26, 27 in the base part 5a, and a chain link roller 15 is journalled on a further bearing bush 29 on the pin 23. A toothed drive sprocket (not shown) engages the rollers 15 for driving of the chain assembly. The three separate journalled bushings 26, 27, 29 serve to reduce the need for external lubrication and to maximize the life of the chain assembly. The upper and lower bushes 26, 27 also serve to facilitate chain articulation while the separate central bush 29 enables free rotation of the roller 15.

The embodiment shown in FIG. 3 is similar to that of FIGS. 1 and 2 except that the link plates 21, 22 are located within the base part 5a.

FIG. 4 shows a chain clip unit of a stenter clip chain assembly, according to another embodiment of the present invention and also includes a double track 3, 4 but in this case the vertical track parts 3, 4 are in spaced parallel relationship, being spaced by spacer plate 20 and secured to body member 1 by screws 21. The longer track 3 provides side surfaces for the vertical axis rollers 7a, 7b, 8, 9 and 12 while the track 4 of lesser vertical extent provides the edges surfaces for the horizontal axis rollers 10a, 10b and 11. Otherwise, it is felt the arrangement of FIG. 4 will be fairly self-explanatory and is similar in operation to the embodiments of FIGS. 1 to 3: like parts carry like reference numerals. In all of the embodiments, it will be noted that the surface 4a for supporting rollers 10a, 10b is located intermediate the levels of rollers 7a, 7b and rollers 8, 9.

The stenter chain clip assemblies of FIGS. 1 and 4 provide particular benefits in the very high speed production of extremely thin polyester film where clean and continuous operation is essential, such as in the production of polyester film for electrical and recording applications.

The use of a separate double-track rail assembly as in the above described embodiments provides economies since if wear occurs in the tracks of the rail assembly, it may be necessary to replace only one of the tracks 3, 4 (or part thereof). More esspecially, there are particular advantages in the double-track arrangement of FIGS. 1 to 3. Thus in the track assembly of FIGS. 1 to 3, the vertical axis rollers 7a, 7b can have increased vertical spacing from the vertical axis rollers 8, 9 without the need for increased vertical depth of the tracks 3, 4 which contrasts with the single track arrangement shown in UK Pat. No. 1,504,450.

The above described embodiments of the present invention have the following further advantages:

All rollers and chain link parts are located substantially below the level of the film and this has the benefit of minimizing contamination of the film by track wear debris and surface lubricants.

Two horizontal axis rollers (i.e. 10a, 10b) provide stability in the longitudinal direction and take the weight of the clip chain assembly which is the major life reducing force in a high speed thin film stenter chain.

The horizontal dimension (i.e. distance X) from the gripping line to the center of chain articulation is maintained at a minimum to reduce the degree of machine drawn orientation in the film when the chain is at the first divergence point of the track system.

We claim:

1. A stenter film clip chain assembly comprising
   (a) a chain means including chain units;
   (b) a rail means to movably support said chain units, said rail means comprising a twin-track assembly including two separate tracks;
   (c) film clips supported by the chain units;
   (d) a support structure for said rail means;
   (e) a plurality of rollers carried by each chain unit and engaging said rail means; and
   (d) chain link means adapted for driving engagement by drive means for driving the chain means; said rollers comprising
      (1) vertically spaced pairs of transversely opposed vertical axis rollers which engage said track assembly to restrain horizontal forces;
      (2) horizontally spaced first horizontal axis rollers engaging a surface of said track assembly for weight support;
      (3) a further horizontal axis roller engageable with a surface of the track assembly to restrict upper lift of the chain unit;
   the surfaces engaged by said first and further horizontal axis rollers being located between the levels of the mid-planes of the vertically spaced vertical axis rollers;
   said chain link means being located substantially underneath the film clip.

2. A chain assembly as claimed in claim 1, wherein said chain link means comprises a roller link adapted for engagement with a toothed drive sprocket wheel for driving of the chain means.

3. A chain assembly as claimed in claim 1 or 2, wherein said track assembly comprises a vertically spaced pair of opposed but aligned vertical tracks, the vertical axis rollers running on side surfaces of the tracks and the horizontal axis rollers running on the edge surfaces of the tracks.

4. A chain assembly as claimed in claim 1 or 2, wherein said twin track assembly comprises a spaced parallel pair of endless vertical tracks, one longer than the other, the longer one of the tracks providing side surfaces for engagement by the vertical axis rollers while the other shorter track provides edge surfaces for the horizontal axis rollers.

5. A chain assembly as claimed in claim 2, wherein the chain link means include link plates for linking successive chain units, and said link plates are carried by a link pin supported in the chain unit, said link pin rotatably carrying the link roller which engages the the toothed drive sprocket.

6. A chain assembly as claimed in claim 5, wherein transversely spaced link plate pairs are provided, said link plate pairs being located externally of a base part of the chain unit.

7. A chain assembly as claimed in claim 5 or 6, wherein separate bearing bushes are provided between the link pin and the chain unit and between the link roller and the link pin.

8. A stenter film clip assembly comprising
   (a) a plurality of chain units each including a body part;
   (b) rail means to movably support said chain units comprising two vertically spaced and opposed rails, each of which rails is arranged vertically;
   (c) horizontal axis rollers rotatably supported by said body parts adapted to run on inner edge surfaces of the opposed rails to support the weight of the chain assembly and to resist chain lift;
   (d) each chain unit body part including arm means extending between the vertically spaced rails;
   (e) pairs of horizontally opposed vertical axis rollers supported by said body part arm means adapted to engage opposite side surfaces flanking the inner edge surfaces of said rail means to resist horizontal forces;
   (f) a plurality of film clips carried by said body parts of said chain unit; and
   (g) support pin means of the chain link means connecting successive chain units carried by said body parts and located on the same side of the vertically spaced rails as the film clip.

9. A chain assembly as claimed in claims 1 or 8 wherein at least one vertical axis roller engages a side surface of the track assembly substantially on a level with film gripped by the film clip and serves to resist film stretching forces.

10. A chain assembly as claimed in claims 1 or 8 wherein the chain unit includes a base part, and the film clip includes a film gripping platform and a co-operating gripping lever, the film gripping platform being located on an upper horizontal surface of said base part.

11. A chain assembly as claimed in claims 1 or 8 wherein the level of the film gripped by the film clip is above the level of the rail surfaces engaged by the horizontal axis rollers.

* * * * *